(12) United States Patent
Mariani et al.

(10) Patent No.: US 8,554,811 B2
(45) Date of Patent: Oct. 8, 2013

(54) SOFTWARE ROUTINE FINGERPRINTS IN PERFORMANCE DATA

(75) Inventors: Rico Mariani, King County, WA (US); Hazim Shafi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 12/615,370

(22) Filed: Nov. 10, 2009

(65) Prior Publication Data

US 2011/0113407 A1    May 12, 2011

(51) Int. Cl.
G06F 17/30    (2006.01)
G06F 9/45    (2006.01)

(52) U.S. Cl.
USPC .......................................... 707/899; 717/130

(58) Field of Classification Search
USPC ........................... 707/E17.001, 899; 717/130
See application file for complete search history.

(56) References Cited

U.S. PATENT DOCUMENTS

| | | | |
|---|---|---|---|
| 5,828,883 A | 10/1998 | Hall | |
| 7,289,947 B2 | 10/2007 | Ammons | |
| 2005/0081107 A1* | 4/2005 | DeWitt et al. | 714/38 |
| 2007/0294673 A1 | 12/2007 | Guerrera et al. | |
| 2008/0177756 A1 | 7/2008 | Kosche et al. | |

OTHER PUBLICATIONS

Duesterwald, et al., "Software Profiling for Hot Path Prediction: Less is More", Retrieved at <<http://delivery.acm.org/10.1145/380000/379241/p202-duesterwald.pdf?key1=379241&key2=2955292521&coll=GUIDE&dl=GUIDE&CFID=52761308&CFTOKEN=36409819>>, Nov. 12-15, 2000, pp. 202-211.
"JProbe Suite, Comprehensive Java Performance Tuning", Retrieved at <<http://www.kapitec.com/Produits/JProbe/en/index.html>>, Aug. 21, 2004, pp. 3.
"VBA Code Profiler", Retrieved at <<http://www.bandwood.com/vbacp.htm>>, Apr. 26, 2002, pp. 3.
"Introduction to the PGPROF Profiler", Retrieved at <<http://www.vcpc.univie.ac.at/information/software/pgi/pgprof/pgprof03.htm>>, May 30, 2003, pp. 5.
"The Design Flow Process", Retrieved at <<http://ce.et.tudelft.nl/DWB/designflowDWB.html>>, Sep. 14, 2009, pp. 4.

* cited by examiner

*Primary Examiner* — Amresh Singh
(74) *Attorney, Agent, or Firm* — Ogilvie Law Firm (57) ABSTRACT

Program profile data is used to prepare temporal cost-incurrence fingerprints, which show when a given method or method frame incurred specified cost(s) during a period of interest while a program was/is executing. Relationships between methods can be elicited by studying their temporal cost-incurrence fingerprints. Methods which are often good candidates for optimization can be automatically selected by identifying a small set of methods whose amount of cost lies within specified bounds relative to the most costly method, or in absolute terms, and whose respective fingerprints differ from one another.

20 Claims, 9 Drawing Sheets

Start time: 181,741   End time: 2,229,927   Interval Length: 2,048,186

| Incl# | Excl# | Incl% | Excl% | Name |
|---|---|---|---|---|
| 1805 | 0 | 100% | 0% | Root |
| 1805 | 0 | 100% | 0% | ...tid (_2924) |
| 1304 | 0 | 72% | 0% | ntdll.dll!_RtlUserThreadStart |
| 1304 | 0 | 72% | 0% | ...devenv.exe!CDevEnvAppId::Run |
| 1269 | 0 | 70% | 0% | devenv.exe!util_CallVsMain |
| 1266 | 0 | 70% | 0% | => msenv.dll!VStudioMain |
| 1266 | 0 | 70% | 0% | => msenv.dll!VStudioMainLogged |
| 1230 | 0 | 68% | 0% | => msenv.dll!InitFMain |
| 1088 | 0 | 60% | 0% | => msenv.dll!InitUIThread |
| 1068 | 0 | 59% | 0% | => msenv.dll!InitMainMenuWindow |
| 1068 | 0 | 59% | 0% | => msenv.dll!CreateMainFrame |
| 1067 | 0 | 59% | 0% | => msenv.dll!CreatewpfMainFrame |
| 339 | 0 | 18% | 0% | \|msenv.dll!Gel::CreateWPFUIElementContainer |
| 339 | 0 | 18% | 0% | \|...:CreateWPFUIElementContainer |
| 317 | 0 | 17% | 0% | \|dynamicClass::IL_STUB |
| 317 | 0 | 17% | 0% | \|...:CreateWPFUIElementContainer |
| 727 | 0 | 40% | 0% | \|Other |
| 616 | 0 | 34% | 0% | \|msenv.dll!OnMainWindowCreated |
| 616 | 0 | 34% | 0% | \|unknown"!0x008ba1e2 |
| 324 | 0 | 17% | 0% | \|clr.dll!COMToCLRDispatchHelper |
| 324 | 0 | 17% | 0% | \|...:ShowWindow |
| 316 | 0 | 17% | 0% | \|...:ShowHelper |
| 316 | 0 | 17% | 0% | \|...:SafeCreateWindowDuringShow:1 |
| 293 | 0 | 16% | 0% | => ...:SetLayoutSize |
| 293 | 0 | 16% | 0% | => ...:Measure |
| 292 | 0 | 16% | 0% | => ...:MeasureCore |
| 501 | 0 | 27% | 0% | => Other |
|  |  |  |  | \|Other |

Fig. 3

| Incl# | Excl# | Incl% | Excl% | Name |
|---|---|---|---|---|
| 1805 | 0 | 100% | 0% | tid ( 2924) |
| 1805 | 0 | 100% | 0% | devenv.exe (2588) |
| 1346 | 0 | 74% | 0% | devenv.exe!CDevEnvAppId::Run |
| 1346 | 0 | 74% | 0% | devenv.exe!winMain |
| 1346 | 0 | 74% | 0% | devenv.exe!_tmainCRTStartup |
| 1331 | 0 | 73% | 0% | kernel32.dll!BaseThreadInitThunk |
| 1331 | 0 | 73% | 0% | ntdll.dll!__RtlUserThreadStart |
| 1328 | 0 | 73% | 0% | msenv.dll!VStudioMainLogged |
| 1325 | 0 | 73% | 0% | msenv.dll!VStudioMain |
| 1311 | 0 | 72% | 0% | devenv.exe!util_CallVsMain |
| 1304 | 0 | 72% | 0% | ntdll.dll!_RtlUserThreadStart |
| 1300 | 0 | 72% | 0% | msenv.dll!InitFMain |
| 1252 | 0 | 69% | 0% | clr.dll!COMToCLRDispatchHelper |
| 1252 | 0 | 69% | 0% | clr.dll!InvokeStub |
| 1252 | 0 | 69% | 0% | clr.dll!COMToCLRWorkerBody |
| 1250 | 0 | 69% | 0% | clr.dll!COMToCLRWorkerDebuggerWrapper |
| 1243 | 0 | 68% | 0% | clr.dll!COMToCLRWorker |

Fig. 4

| Incl# | Excl# | Incl% | Excl% | First | Last | Occurrence Mask | Name |
|---|---|---|---|---|---|---|---|
| 1805 | 0 | 100% | 0% | | | | Root |
| 1805 | 0 | 100% | 0% | 182484 | 2229210 | xxxxxxxxxxxxxxxxxxxxxxxxxx_x | ...tid (2924) |
| 1304 | 0 | 72% | 0% | 182484 | 2229210 | xxxxxxxxxxxxxxxxxxxxxxxx_x_x | ntdll.dll!_RtluserThreadstart |
| 1304 | 0 | 72% | 0% | 182484 | 2229210 | xxxxxxxxxxxxxxxxxxxxxxxx_x_x | ...devenv.exe!CDevEnvAppId::Run |
| 1269 | 0 | 70% | 0% | 219163 | 2229210 | xxxxxxxxxxxxxxxxxxxxxxx_x_x | devenv.exe!util_CallVSMain |
| 1266 | 0 | 70% | 0% | 226672 | 2229210 | xxxxxxxxxxxxxxxxxxxxxx_x_x | => msenv.dll!VStudioMain |
| 1266 | 0 | 70% | 0% | 226672 | 2229210 | xxxxxxxxxxxxxxxxxxxxxx_x_x | => |
| msenv.dll!VStudioMainLogged | | | | | | | |
| 1230 | 0 | 68% | 0% | 226672 | 2030417 | xxxxxxxxxxxxxxxxxxxxx_x_x | => msenv.dll!InitFMain |
| 1088 | 0 | 60% | 0% | 451603 | 2030417 | _xxxxxxxxxxxxxxxxxxxx_x_x | => msenv.dll!InitUIThread |
| 1068 | 0 | 59% | 0% | 451603 | 2004289 | _xxxxxxxxxxxxxxxxxxx_x_x | => ..!InitMainMenuWindow |
| 1068 | 0 | 59% | 0% | 451603 | 2004289 | _xxxxxxxxxxxxxxxxxxx_x_x | => ..!CreateMainFrame |
| 1067 | 0 | 59% | 0% | 452618 | 2004289 | _xxxxxxxxxxxxxxxxxxx_x_x | => ..!CreateWpfMainFrame |
| 339 | 0 | 18% | 0% | 453623 | 910735 | _xxxxxxxx | |
| |..CreatewPFUIElementContainer | | | | | | |
| 339 | 0 | 18% | 0% | 453623 | 910735 | _xxxxxxxx | |..::IL_STUB |
| 317 | 0 | 17% | 0% | 508623 | 910735 | _xxxxxxx | |
| ..CreatewPFUIElementContainer | | | | | | | |
| 317 | 0 | 17% | 0% | 508623 | 910735 | _xxxxxxx | other |
| 727 | 0 | 40% | 0% | 911735 | 2004289 | xxxxxxxxxxx_x_x | ..OnMainWindowCreated |
| 616 | 0 | 34% | 0% | 1010480 | 2004289 | xxxxxxxxxx_x_x | "Unknown"!0x008ba1e2 |
| 616 | 0 | 34% | 0% | 1010480 | 2004289 | xxxxxxxxxx_x_x | |
| ..COMToCLRDispatchHelper | | | | | | | |
| 324 | 0 | 17% | 0% | 1443113 | 2004289 | xxxxxx_x_x | |..ShowWindow |
| 324 | 0 | 17% | 0% | 1443113 | 2004289 | xxxxxx_x_x | |..ShowHelper |
| 316 | 0 | 17% | 0% | 1443113 | 1989071 | xxxxxx_x_x | |
| ..SafeCreateWindow... | | | | | | | |
| 316 | 0 | 17% | 0% | 1443113 | 1989071 | xxxxxx_x_x | => |
| ..SetLayoutSize | | | | | | | |
| 293 | 0 | 16% | 0% | 1443113 | 1738071 | xxxxx | => ...Measure |
| 293 | 0 | 16% | 0% | 1443113 | 1738071 | xxxxx | => |
| ..MeasureCore | | | | | | | |
| 293 | 0 | 16% | 0% | 1443113 | 1738071 | xxxxx | |
| 292 | 0 | 16% | 0% | 1010480 | 1419041 | xxxxxxx | => Other |
| 501 | 0 | 27% | 0% | 220163 | 2021441 | xxxxx_x_x_x_xxxx_x_xxxx | other |

Fig. 5

```
Incl%  First    Last     Occurrence Mask                            Name
-----------------------------------------------------------------------
100%   182484   2229210  xxxxxxxxxxxxxxxxxxxxxxxxxxxx               Root
100%   182484   2229210  xxxxxxxxxxxxxxxxxxxxxxxxxxxx                ...tid ( 2924)
 72%   182484   2229210  xxxxxxxxxxxxxxxxxxxxxxxxxxx_x                |ntdll.dll!_RtlUserThreadStart
 72%   182484   2229210  xxxxxxxxxxxxxxxxxxxxxxxxxxx_x                 |ntdll.dll!_RtlUserThreadStart
 70%   219163   2229210  xxxxxxxxxxxxxxxxxxxxxxxxxx__x                  ...devenv.exe!CDEvEnvAppId::Run
 70%   226672   2229210  xxxxxxxxxxxxxxxxxxxxxxxxxx__x                   devenv.exe!util_CallVsMain
 70%   226672   2229210  xxxxxxxxxxxxxxxxxxxxxxxxxx__x                    => msenv.dll!VStudioMain
 68%   226672   2229210  xxxxxxxxxxxxxxxxxxxxxxxxxx__x                    => msenv.dll!VStudioMainLogged
 60%   451603   2030417  _xxxxxxxxxxxxxxxxxxxxxx_x      *                 => msenv.dll!InitFMain
 59%   451603   2004289   xxxxxxxxxxxxxxxxxxxxxx_x                        => msenv.dll!InitUIThread
 59%   451603   2004289   xxxxxxxxxxxxxxxxxxxxxx_x                        => ...!InitMainMenuWindow
 59%   452618   2004289   xxxxxxxxxxxxxxxxxxxxxx_x      *                 => ...!CreateMainFrame
 18%   453623   910735    xxxxxxxx                                        => ...!CreatewpfMainFrame
 18%   453623   910735    xxxxxxxx                                        => ...!CreatePFUIElementContainer
 17%   508623   910735    xxxxxxxx                       *                  |...!CreatewPFUIElementContainer
 17%   508623   910735    xxxxxxxx                                          |...::IL_STUB
 40%   911735   2004289            xxxxxxxxxxxxxx_x                         |Other
 34%   1010480  2004289            xxxxxxxxxxxxxx_x     *                    ...OnMainWindowCreated
 34%   1010480  2004289            xxxxxxxxxxxxxx_x                           "unknown"!0x008ba1e2
 17%   1443113  2004289                  xxxxxxx_x                           !COMToCLRDispatchHelper
 17%   1443113  1989071                  xxxxxx_x                            ...ShowWindow
 17%   1443113  1989071                  xxxxxx_x      *                     ...ShowHelper
 16%   1443113  1738071                  xxxxxx        *                        ...SafeCreateWindow...
 16%   1443113  1738071                  xxxxxx                                 => ...SetLayoutSize
 16%   1443113  1419041                  xxxxx                                  => ...Measure
 16%   1010480  1738071                  xxxxxx        *                        => ...MeasureCore
 27%   220163   2021441  xxxxxxx_x_x_xxxx_x_xxxxx                             => Other
                                                                     |Other
```

Fig. 6

| Incl% | Occurrence Mask | Name |
|---|---|---|
| 69% | xxxxxxxxxxxxxxxxxxxxxxxxx_x | clr.dll!COMToCLRDispatchHelper |
| 64% | xxxxxxxxxxxxxxxxxxxxxxxxx_x | msenv.dll!InitUIThread |
| 44% | xxxxxxxxxxxxxx_x | msenv.dll!OnMainWindowCreated |
| 39% | xxxxxxxxxxxxxxx_x | ..FrameworkElement::MeasureCore |
| 35% | xxxxxxxxxxxxxxx | ..Grid::MeasureOverride |
| 30% | xx__xx_xxxxxxxxxxx | ..DependencyObject::UpdateEffectiveValue |
| 30% | xxx_xxxxxxxxx | ..HwndSource::set_RootVisualInternal |
| 29% | xxxxxxxxxxxx_x | ..HwndSource::SetLayoutSize |
| 27% | xx_x__xxx_xxxxxxxxx | ..XamlWriter::WriteNode |
| 27% | x_xx_xxxxxxxxxxxx | ..DependencyObject::NotifyPropertyChange |
| 24% | xxxx_xxxx_x | ..DockPanel::MeasureOverride |
| 23% | xxxxxxxxxxxxxxx_x_xxx_x_xxx_x | ntkrnlpa.exe!_KiFastCallEntry |
| 21% | xxxx_xxx | ..ToolBarTray::MeasureOverride |
| 19% | xxxxxxxx_x | ..Window::ShowHelper |
| 19% | xx_xxxxxx_xxx__xxxxxxxx_x | clr.dll!CallDescrWorkerWithHandler |
| 18% | xxxxxxxx | ..Gel::CreateWPFUIElementContainer |
| 18% | xx_xxxxxxxxx | ..FrameworkElement::ApplyTemplate |
| 18% | xxxxxx | ..BaseToolbarHost::AddToolbar |
| 17% | xxxxxxx | ..CreateWPFUIElementContainer |
| 17% | xxxxxxxxxx_xxx | ..StyleHelper::GetChildValue |

SOFTWARE ROUTINE FINGERPRINTS IN PERFORMANCE DATA

BACKGROUND

While a software program is executing, the program uses resources manifested by processor cycles, I/O invocations, and memory space, for example. Resource uses are sometimes referred to as program runtime costs. Some program runtime costs can be identified by a source code review. However, source code is not always available, and even when source is available the runtime behavior of a program is often difficult to predict based on the source code alone. Predicting program behavior based on source code alone is particularly difficult with programs that contain code generated from thousands if not millions of lines of source code.

Accordingly, some tools have been created to directly measure program resource usage, in order to assist developers in reducing resource usage without an unacceptable loss of desired program functionality. In particular, various software profiler tools exist. Some profilers report only the amount of resources consumed within a particular procedure. Some profilers display, for each selected procedure, the fraction of total program execution time that was spent executing that procedure and the procedures it called. Some profilers provide resource usage information only for a calling procedure and its immediate called procedure. Some profilers display a graph in which nodes represent components of a system, and edges represent interactions among components. The nodes and/or edges of the graph are annotated with costs.

SUMMARY

By automatically selecting methods which are relatively expensive, and which are different from one another as to the times at which they incur costs, an embodiment discussed herein can provide developers with good starting points for possible optimizations to reduce program cost. Accordingly, some embodiments not only tell developers how costly certain methods are but also show developers the time(s) within program execution at which those costs are incurred. The cost-incurrence times for a given method provide a "fingerprint" for that method. Fingerprints may likewise be provided for method frames, namely, method executions within a particular call chain context. The fingerprints may show developers when processor cycles, energy consumption, memory, file I/O, network I/O, and/or any combination of measurable costs occur for given methods/method frames.

Some embodiments obtain (i) profile data for a plurality of cost-incurring items capable of incurring a specified category of cost, and (ii) a specification of a plurality of time intervals within an execution time period of interest. A temporal cost incurrence fingerprint is then created. The fingerprint indicates for each cost-incurring item and for each time interval whether or not that item incurred a cost in the specified category within that time interval. Specified cost categories may include, for example, processor usage measured in time, energy consumption measured in joules, file I/O measured in time, file I/O measured in size, network I/O measured in time, network I/O measured in size, and/or memory measured in size. The temporal cost incurrence fingerprint includes a plurality of individual fingerprints, with each individual fingerprint indicating interval activity for an individual method or method frame, for example. Interval activity indicates which of the time intervals that method/method frame incurred the cost within and which of the time intervals it did not incur the cost within. Some embodiments automatically select N most expensive methods/method frames each of whose cost is less than M percent of total cost and each of which has a different individual fingerprint from the other selected most expensive methods/method frames. The temporal cost incurrence fingerprint and selected method/method frame names and their individual fingerprints can then be displayed to assist developers with program debugging and/or optimization.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 5 is a listing illustrating a profiler trace output with temporal cost-incurrence fingerprints as discussed herein, and also showing first and last cost-incurrence time for each method;

FIG. 6 is an alternate format listing for the FIG. 5 profiler trace output;

DETAILED DESCRIPTION

Overview

Profiler tools generally provide information about program execution cost. Available profilers include, for example, a Microsoft Visual Studio® tool, an Intel VTune® tool, and an AMD Code Analyst™ tool (marks of their respective owners as indicated).

Tools that compute costs of programs for analysis typically aggregate costs to the methods in the program for the run. At each measurement interval the cost for that interval is attributed to the method(s) that were running at that time. Cost simply accumulates for the analyzed period. When analysis is complete the aggregated costs can be displayed in various ways, such as in a call-tree with summary costs, or in ordered lists with names and costs. However, temporal information is lost, in that such reports provide little or no information about precisely when the costs were incurred.

Capturing approximate representations of such temporal information (e.g., as a time signature of the costs) can help produce visually compelling displays from which relationships between methods can be inferred by developers. Representations of temporal cost-incurrence information also provides support for further automated analysis that can highlight interesting points for investigation by developers.

Some embodiments described herein provide aggregate cost information, but additionally record information that more precisely represents when a cost was incurred. An exact representation of when costs were incurred could be too expensive to implement and may not lend itself well to reporting. But selected approximations can be very helpful in identifying code to consider for correction and/or optimization.

For instance, one embodiment uses thirty-two bits to encode a period of interest during program execution, so thirty-two equally-sized time intervals are defined within that period. The embodiment displays a cost-time signature that indicates which of the thirty-two intervals had interesting cost activity. This time-interval-specific summarization into thirty-two intervals is itself useful as a "fingerprint" of the cost the method incurs. This fingerprint can be used for automated analysis as discussed herein. Some embodiments use a different number of intervals, often but not necessarily always a power of two.

One embodiment uses the aggregated costs plus the fingerprints to automatically produce a list of twenty interesting methods for further analysis. This list focuses developer attention on twenty candidates for optimization in a sea of many thousands of methods that might otherwise need to be inspected. Other embodiments provide similar lists, with a different number of candidates.

Some embodiments provide or use capture of cost-incurrence time information on a per symbol basis, using an approximate representation of the exact cost incurrence time to control profiling cost and to provide more comprehensible profiler displays to developers.

Some embodiments use method cost-incurrence time fingerprints to do automated analysis, and in particular to identify similar methods that may also be interesting candidates for optimization or correction.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a device or "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

Programs that can be profiled by an embodiment are not limited to applications. "Program" herein means application, handler, kernel, library, or any other software which can be profiled.

"Process" and "method" generally each have one meaning in the software development context and another meaning in the patent interpretation context. As used herein, however, a "method" is a software routine, such as a function, handler, coroutine, executable member, or the like, rather than a term of art in patent interpretation. Conversely, "process" is used herein as a patent term of art, e.g., "the process comprises the following steps . . . ", not as a software development term of art.

"Automatically" means by use of automation (e.g., general purpose computing hardware configured by software for specific operations discussed herein), as opposed to without any automation. In particular, steps performed "automatically" are not performed by hand on paper or in a person's mind; they are performed with a machine.

Throughout this document, use of the optional plural "(s)" means that one or more of the indicated feature is present. For example, "cost(s)" means "one or more costs" or equivalently "at least one cost".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
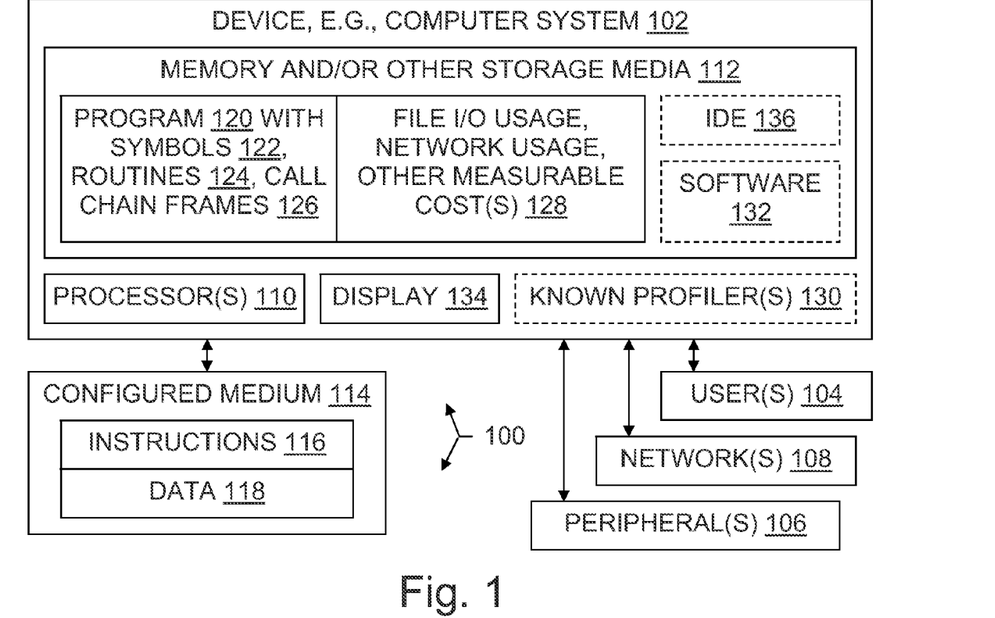
FIG. 1 is a block diagram illustrating a computer system or other device having at least one processor, at least one memory or other storage medium, at least one program to be profiled, and other items in an operating environment which may be present on multiple network nodes, and also illustrating configured storage medium embodiments.

With reference to FIG. 1, an operating environment 100 for an embodiment may include a device with software whose performance can be profiled, such as a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable devices, also includes one or more computer-readable storage media 112. The media 112 may be volatile memory, non-volatile memory, fixed in place media, removable media, magnetic media, and/or optical media. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. Media 112 may be of different physical types.

A program 120 having symbols 122 such as class IDs, file names, method names, and so forth resides in the medium 112. Functions, procedures, handlers, and other routines 124 are invoked within the program as the program executes in the system 102. Routines may invoke themselves and/or other routines, in some configurations, giving rise to call chain frames 126. As the program executes, the routines may utilize resources, thereby incurring costs 128 such as file I/O, network I/O, memory, and the like. Some systems are configured with profilers 130 that only provide aggregate resource usage information or otherwise fail to provide or use cost-incurrence time signatures (fingerprints) as taught herein. These previously known profilers 130 may be used in combination with profiling tools and techniques taught herein, or effectively incorporated into products which are enhanced to also provide the functionality taught herein.

Profiled programs 120, known profilers 130, other software 132, and other items shown in the Figures may reside partially or entirely within one or more media 112, thereby configuring those media. In addition to processors 110, an operating environment may include other hardware, such as a display 134, buses, power supplies, and accelerators, for instance.

A given operating environment 100 may include an Integrated Development Environment (IDE) 136 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
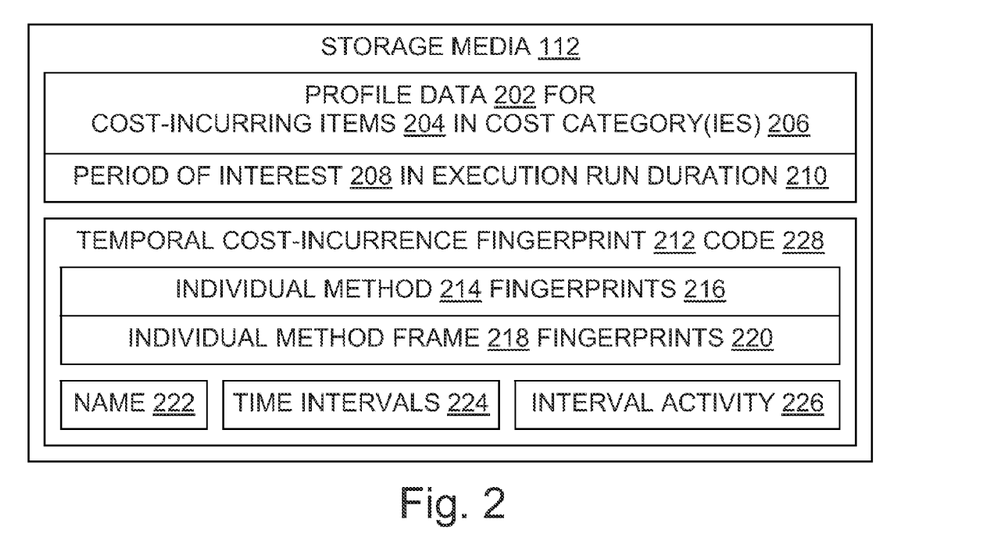
FIG. 2 is a block diagram illustrating temporal cost-incurrence fingerprints, code for automatically selecting optimization candidate methods/method frames, and related components in an example device configured as discussed herein.

FIG. 2 illustrates an architecture which is suitable for use with some embodiments. Profile data 202 is obtained, by instrumentation or other familiar techniques, during some period of interest 208 within an execution run duration 210 of a program 120. The profile data 202 is not necessarily or merely aggregated for the entire period of interest but instead includes data indicating when cost-incurring items 204 such as methods 214 and method frames 218 incurred costs within the period. That is, the profile data 202 can be used to assign cost-incurrence to particular items 204 during particular time intervals 224 which are shorter than the entire period of interest 208. The period of interest 208 may be the entire execution run, or only part of the execution run duration 210. The costs incurred belong to one or more specified cost categories 206, such as file I/O, memory, processor cycles, and so on.

Using the profile data 202, the choice of time intervals 224, and the choice of cost category(ies) 206, fingerprint generating code 228 creates one or more temporal cost-incurrence fingerprints 212. In some embodiments, a fingerprint 212 includes individual method fingerprints 216 showing interval activity 226, namely, showing which time interval(s) 224 an individual method 214 incurred a cost within, and which interval(s) it did not incur the cost within. Similarly, in some embodiments, a fingerprint 212 includes individual method frame fingerprints 220 showing interval activity, namely, which time interval(s) 224 an individual method frame 218 incurred a cost within, and which interval(s) it did not incur the cost within. Each individual fingerprint may be identified in the display 134 by the method's name, caller name(s), and/or other program symbols 122. A collection of individual fingerprints 216 and/or 220 may serve as a fingerprint 212 of the program 120. Individual fingerprints and/or the collection of individual fingerprints may have a name 222, such as a method name or other diagnostic name, for example, as opposed to a non-diagnostic name such as a hexadecimal memory address.

Figure 3:
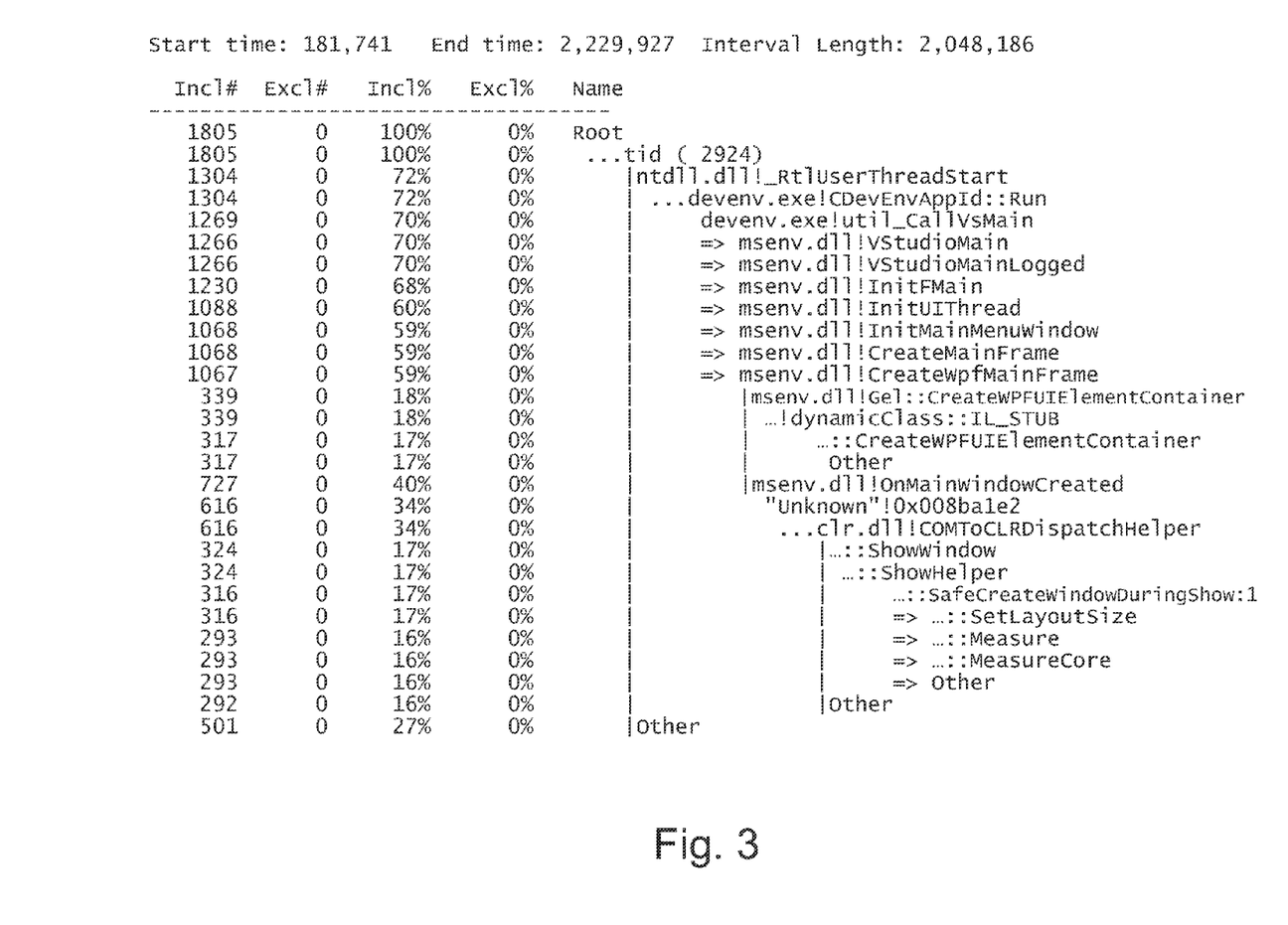
FIG. 3 is a listing illustrating profiler trace output without temporal cost-incurrence fingerprints.

To better understand temporal cost-incurrence fingerprints, consider now some profiler output which lacks such fingerprints. FIG. 3 is a listing illustrating profiler trace output without temporal cost-incurrence fingerprints. This listing illustrates familiar reports for many programs and profilers; in this example the listing shows a trace of a Visual Studio® environment startup time. Some symbol names have been shortened in this report because they are quite long.

Figure 4:
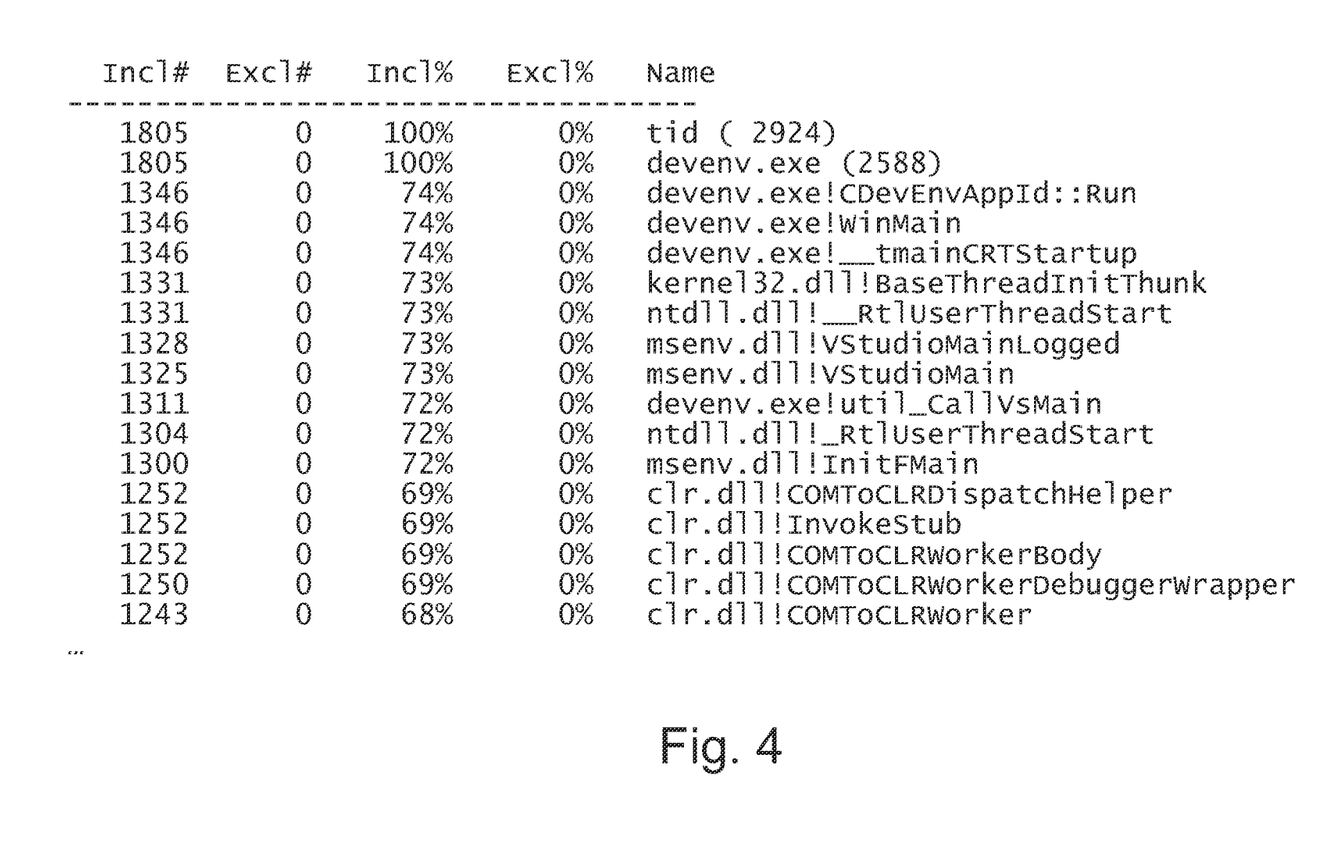
FIG. 4 is a listing of some methods listed in FIG. 3, sorted by cost, again without the benefit of temporal cost-incurrence fingerprints.

FIG. 4 is a listing of some methods from FIG. 3, sorted by cost, again without the benefit of temporal cost-incurrence fingerprints. A typical full report would contain many more entries than those shown in FIG. 3. In practice, the top of the FIG. 4 list is not helpful, because it says in effect "the big cost of your system is due to its main run method". The statement is correct, but it provides little help in terms of candidates for optimization or correction of a program 120. A comparably useful statement about automobiles would be "your car is using gasoline during the times when it is running."

By contrast, FIG. 5 is a listing illustrating a profiler trace output with temporal cost-incurrence fingerprints as discussed herein. The example in FIG. 5 also shows first and last cost-incurrence time for each method. The listing in FIG. 5 adds temporal information to the display, illustrating an overall shape of the profile data 202 in terms of what is running (that is, incurring processor cycles as a cost) at what time interval(s) within the specified period of interest. FIG. 6 is an alternate format listing for the FIG. 5 profiler trace output.

In FIGS. 5 and 6, a central block labeled "Occurrence Mask" shows a fingerprint 216 of each method 214, with the X's indicating activity during the time intervals 224. In this example, each time interval is one-thirty-secondth of the period of interest 208. The fingerprints provide insight into program behavior and method relationships. For instance, from FIG. 6 one can see that CreateWPFUIElementContainer and an associated branch happened before OnMainWindowCreated. Similarly, one can see that the Measure method is running near the end of the period. One also sees that OnMainWindowCreated had three separate activity periods, one very long one and then two quick ones, and that they corresponded to activity in InitMainWindow but not in CreateWPFUIElementContainer.

In FIGS. 5 and 6, the columns labeled "First" and "Last" indicate the time index of the first and last measured cost associated with the symbol 122 (symbols correspond with methods in these Figures). Those time indexes are captured with a precision corresponding to the size of the time intervals in some embodiments and with even greater precision in other embodiments.

Note that certain methods in FIGS. 5 and 6 have been marked with an asterisk. These methods are automatically selected as candidates for further investigation by the developer, based on their cost and their unique fingerprint. In one embodiment, tool code 228 automatically selects as candidates the twenty most expensive functions, each of whose cost is less than 70% of the total (so they aren't everything but they are significant) that also have unique fingerprints.

Figure 7:
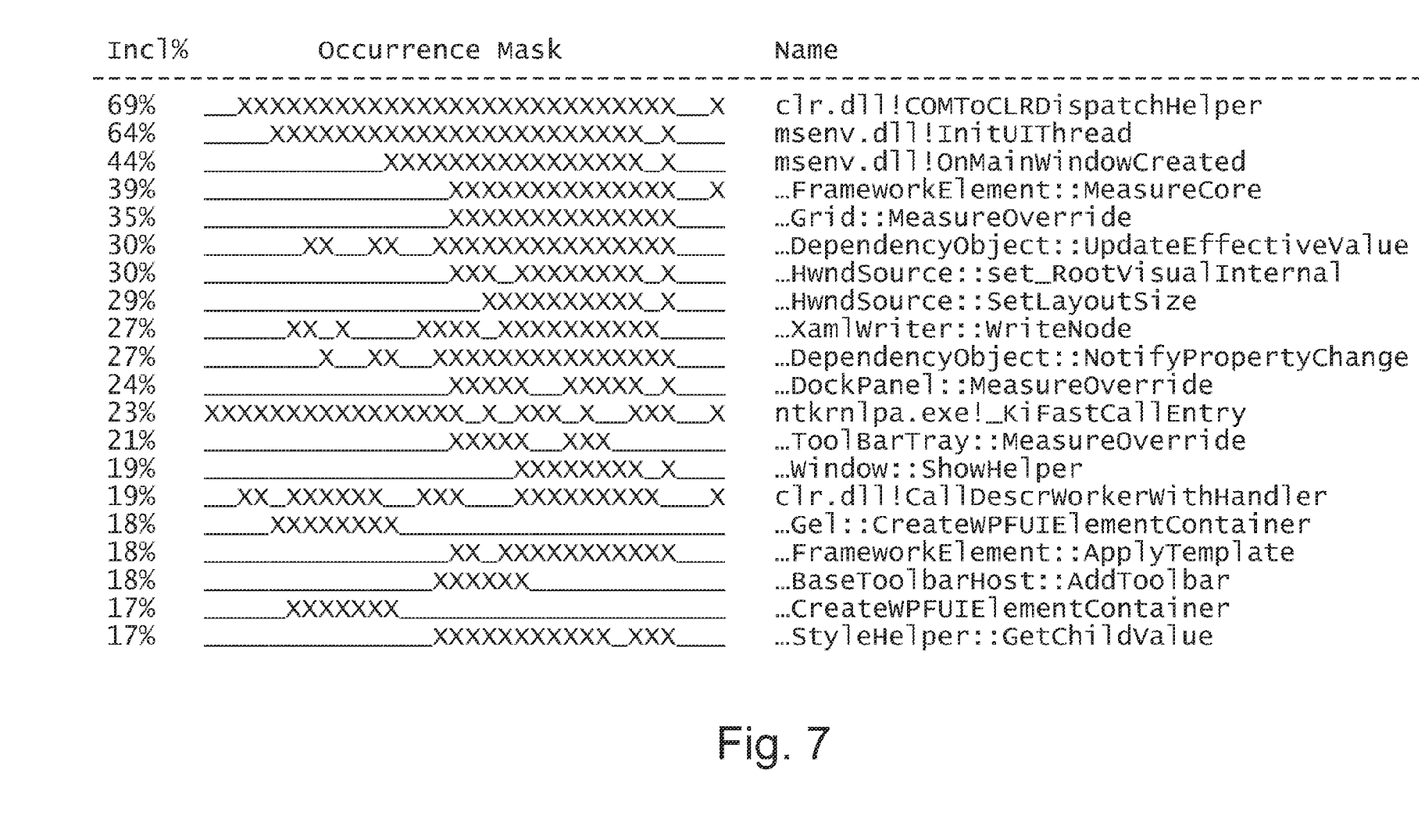
FIG. 7 is a listing of automatically selected relatively expensive methods from the output shown in FIGS. 5 and 6, in which the selected methods have different fingerprints from one another.

FIG. 7 is a listing of automatically selected relatively expensive methods from the output shown in FIGS. 5 and 6, in which the selected methods have different fingerprints from one another. This list is much more compelling than the list in FIG. 4. To trained developers, such automatically selected items are frequently (though not universally) excellent suggestions for investigation. Indeed, this list contains the starting points for key findings made by an inventor when analyzing this particular trace.

Some embodiments provide a computer system 102 with a logical processor 110, a memory medium 112 in operable communication with the logical processor, and a temporal cost incurrence fingerprint 212 residing in the memory and including a plurality of individual item fingerprints (e.g., fingerprints 216 and/or 220) for respective cost-incurring items (e.g., methods 214, other routines 124, method frames 218). Each individual item fingerprint has a plurality of time intervals 224 and indicates for the cost-incurring item and for each time interval whether or not that item incurred the cost 128 within that time interval.

Some embodiments also include a display 134 configured by a visual representation some number of the individual item fingerprints. In a given embodiment, the number may be three, four, five, six, seven, or some other number below fifty, for example. Each item fingerprint includes a diagnostic name 222. Items that lack a diagnostic name may only have a hex address or belong to an unknown module, for example.

Some embodiments also include an item selection tool, such as code 228 capable of automatically selecting N most expensive items each of whose cost is less than M percent of total cost and each of which has a different individual item fingerprint from the other selected most expensive items. N and M are specified values. For example, in various embodiments N is an integer at least three, at least four, at least five, . . . , at least ten, at least eleven, at least twelve, . . . , at least fifteen, . . . , at least twenty, . . . or at least thirty. Upper bounds may also be set on N, e.g., such that N is less than fifty, less than thirty, less than twenty-five, . . . , or equal to one, in various embodiments. Likewise, M may be a value between zero percent and one hundred percent, depending on the embodiment. N and M may either or both be user-specified, or default values in the code 228, or may be selected algorithmically.

In some embodiments, each individual item fingerprint has an associated call chain, and the cost-incurring items include software methods. The invocation/execution of a particular method in a particular call chain (e.g., method A calls B which calls C which . . . calls J which calls the particular method) is referred to herein as a "method frame" 218. A method may have more than one method frame when the method is invoked via different call chains. In one embodiment, for example, a particular software method has at least two individual item fingerprints 220 corresponding to different call chains in which the method is called.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 8:
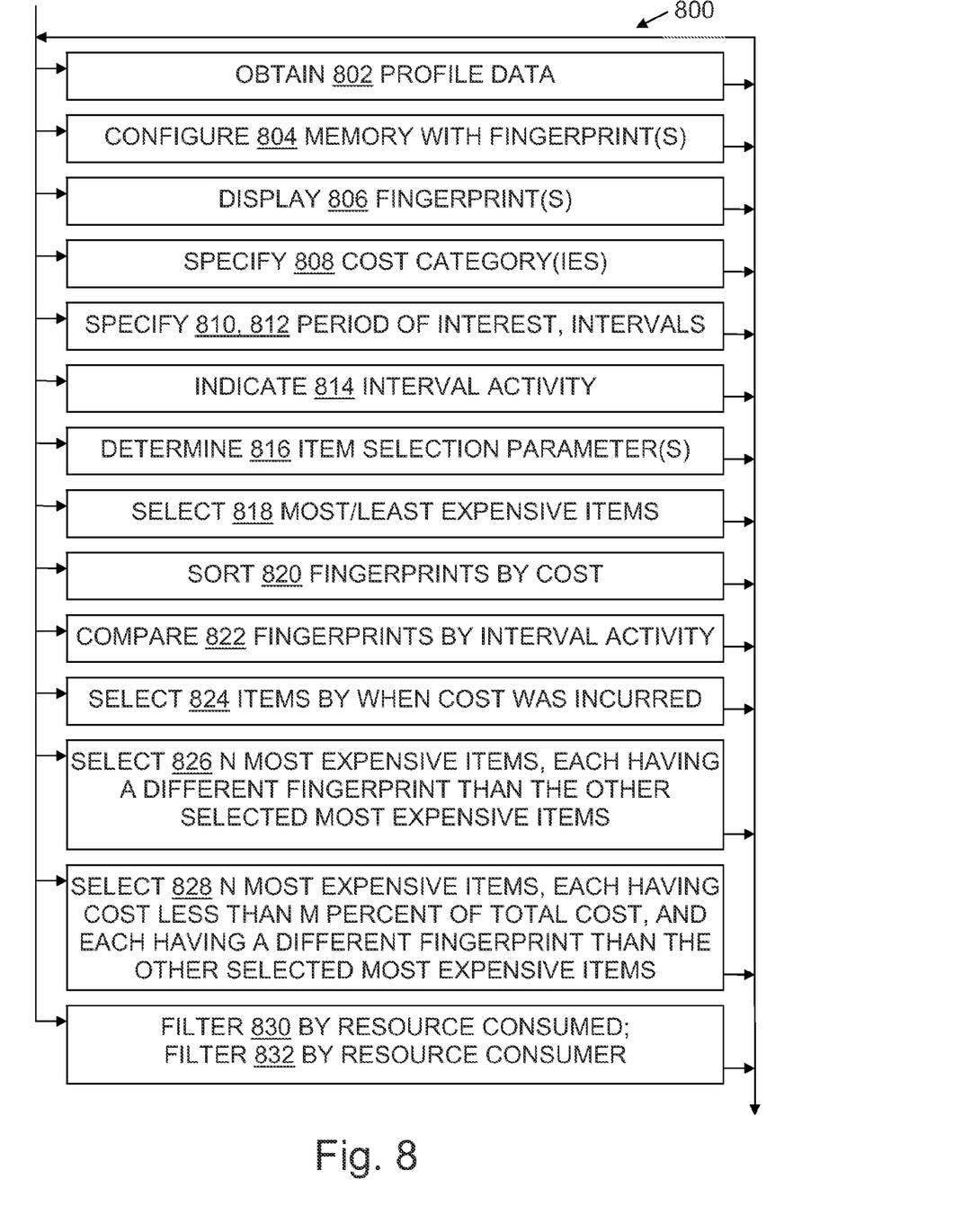
FIG. 8 is a flow chart illustrating steps of some process and configured storage medium embodiments.
Figure 9:
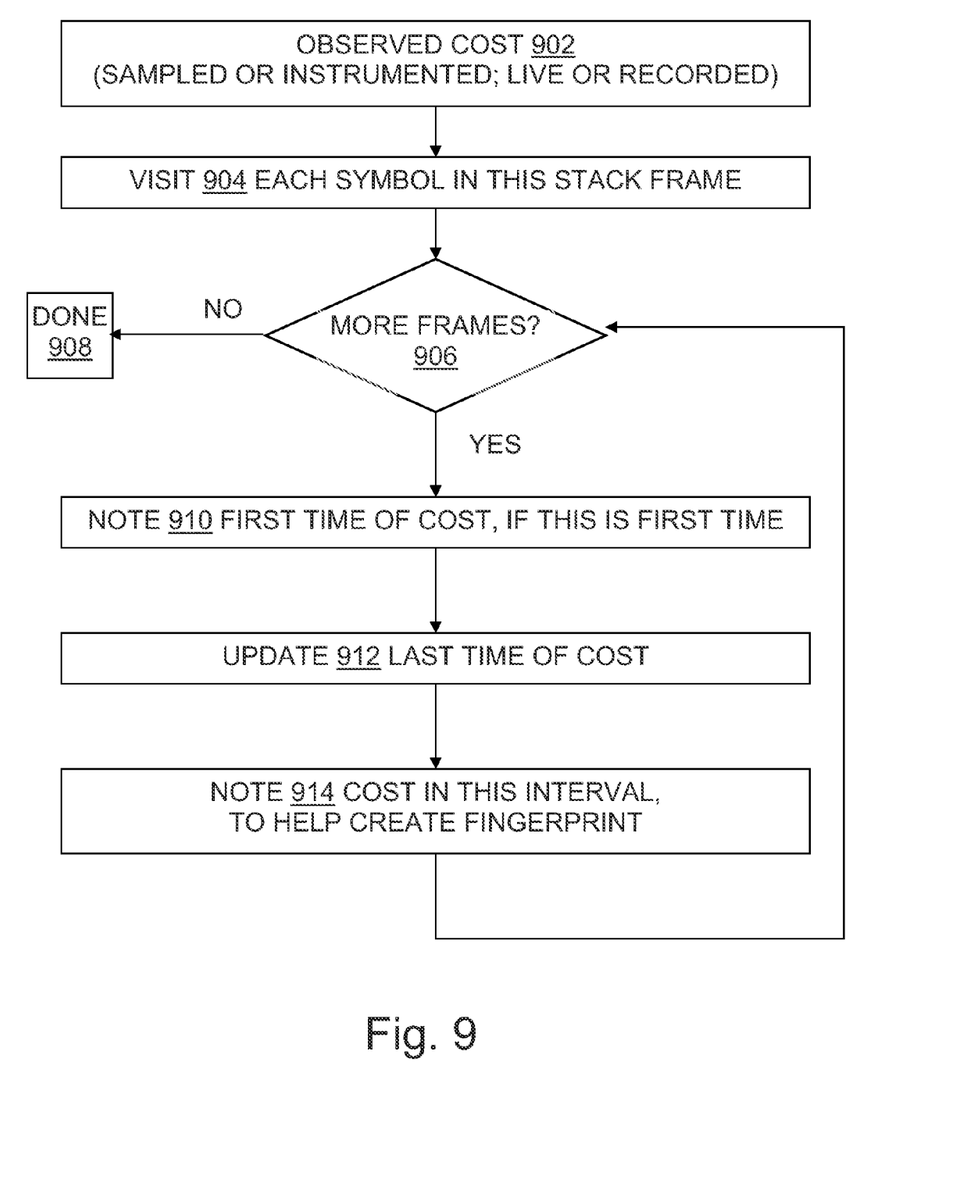
FIG. 9 is a data flow diagram illustrating creation of a temporal cost-incurrence fingerprint.
Figure 10:
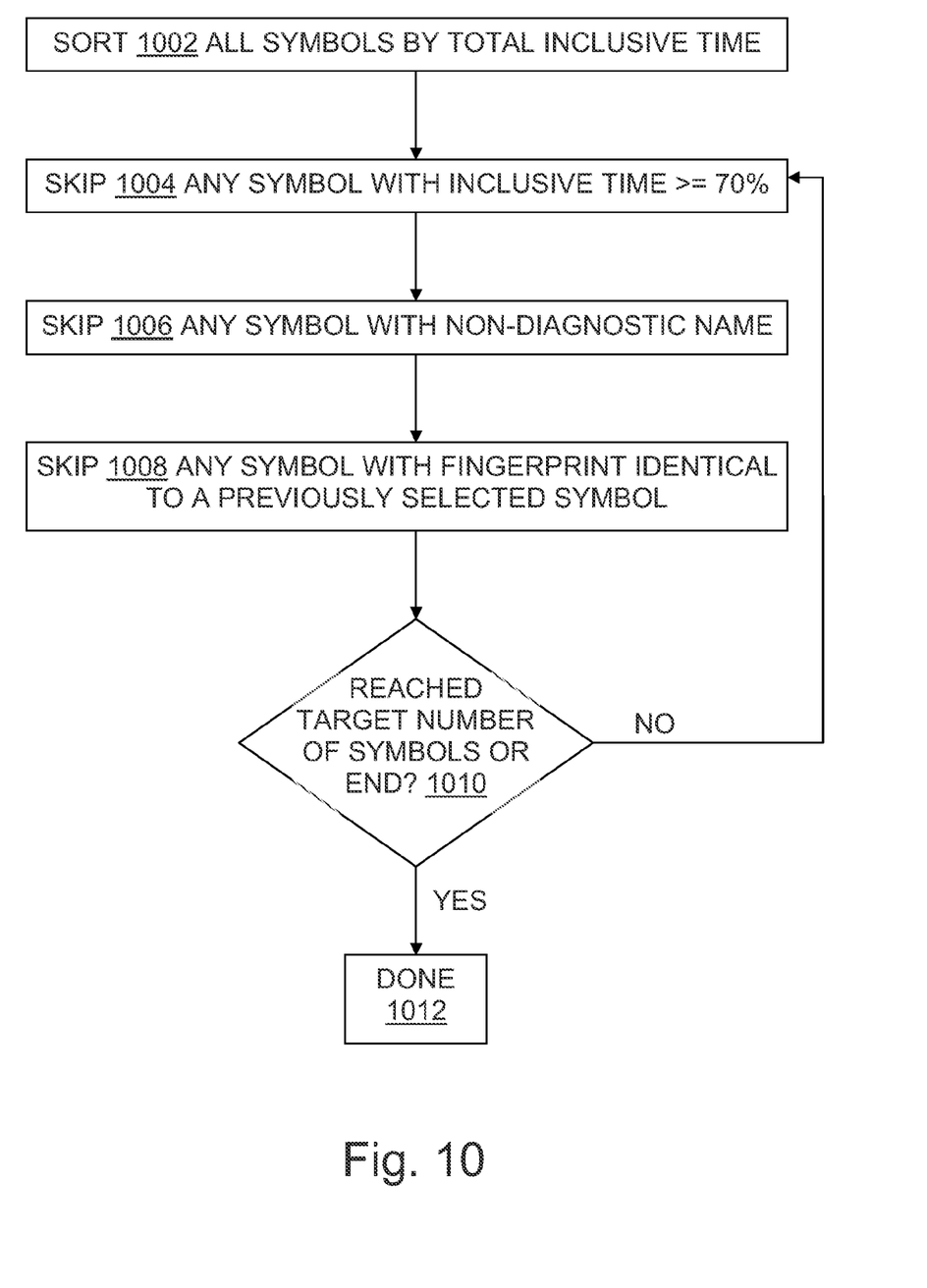
FIG. 10 is a flow chart illustrating selection of relatively expensive items (e.g., methods, method frames) which have different fingerprints from one another.

FIG. 8 illustrates some process embodiments in a flowchart 800. Additional processes are illustrated in FIGS. 9 and 10.

Processes shown in the Figures may be performed in some embodiments automatically, e.g., by an IDE 136 requiring as user input merely an identification of the program 120 of interest. The IDE runs the program, gathers the data 202, and feeds the data to code 228 which selects candidates and displays them to the developer who provided the program name. Processes may also be performed in part automatically and in part manually unless otherwise indicated.

In a given embodiment zero or more illustrated steps of a process may be repeated, perhaps with different parameters or data to operate on. Steps in an embodiment may also be done in a different order than the top-to-bottom order that is laid out in FIG. 8. Steps may be performed serially, in a partially overlapping manner, or fully in parallel. The order in which flowchart 800 is traversed to indicate the steps performed during a process may vary from one instance of the process to another instance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

During a data obtaining step 802, a processor obtains profile data 202 for a plurality of cost-incurring items 204 (e.g., methods (routines), method frames) capable of incurring a specified category 206 of cost. The processor will also obtain an interval count, interval length, or other specification of a plurality of time intervals 224 within an execution time period of interest 208. Step 802 may be accomplished using profiling mechanisms such as sampling and/or code instrumentation, for example. The data 202 may be obtained 802 live (during program 120 execution) or it may have been recorded during an execution that has already finished when the data is obtained 802 for use in creating temporal cost-incurrence fingerprint(s).

During a memory configuring step 804, a memory medium 112 is configured by the processor with a temporal cost incurrence fingerprint 212/216/220. The fingerprint includes a data structure which indicates for each cost-incurring item 204 and for each time interval 224 whether or not that item incurred a cost 128 in the specified category 206 within that time interval. Some embodiments only track a single cost category, and hence the category may be implicit. Other embodiments allow a user to specify one or more cost categories.

Step 804 may be accomplished by iterating through stack frames, noting which interval(s) 224 the stack frame occurred in and which item(s) incurred which cost(s) within the frame. For example, FIG. 9 illustrates a data flow diagram in which observed cost 902 is obtained 802 from profile data 202. Code 228 then iterates through stack frames, to visit 904 each symbol 122 in a given frame. If a test 906 determines there are no additional frames to examine (the current frame may have already been examined) then the iteration is done 908. Otherwise, the frame is examined to determine what cost(s) were incurred, when, and by which item(s). The code 228 notes 910 a cost's first time of incurrence for a given item, if that first incurrence happens in the frame being examined. The code 228 updates 912 the cost's last time of incurrent. The first and last incurrence times (e.g., in columns First and Last of FIGS. 5 and 6) do not necessarily align with time interval 224 boundaries, but may instead have greater precision. Code 228 also notes 914 the cost(s) that were incurred and marks an occurrence mask (e.g., bitmap) accordingly. The occurrence mask thus shows interval activity 226, namely, in which intervals the item incurred the cost.

During a displaying step 806, a display 134 is configured to display one or more fingerprints. FIGS. 5 and 6 show a monochrome textual display, in which X and underscore characters are used to show interval activity. However, other displays are also used in some embodiments, including color, graphics, navigation links, highlights, timelines, and other visualization and/or Graphics User Interface features.

During a cost category specifying step 808, a user or a configuration mechanism specifies one or more cost categories 206. FIGS. 5 and 6 show an example of an implicit specification of processor cycles as the sole cost category of interest. However, other embodiments may specify (as defaults in code and/or by user input) one or more of the following as cost category(ies): processor usage measured in time or cycles, processor non-usage (e.g., blockage) measured in time or cycles, energy/power consumption (e.g., energy measured in joules, or related consumption measures such as power measured in watts), file I/O measured in time, file I/O measured in size (e.g., bytes or sectors), network I/O measured in time, network I/O measured in size (e.g., bytes or packets), volatile and/or non-volatile memory measured in size. In some embodiments, processor cycles are a measurement of time, for the purpose of cost allocation. More generally, a cost category may be specified for any consumption metric that can be attributed to a call stack.

During a period of interest specifying step 810, a user or a default mechanism specifies a period of interest 208. The period of interest may be an entire execution run duration 210, or a proper subset of that duration. The period may be specified in absolute terms, e.g., from elapsed time 182480 microseconds to elapsed time 2229220 microseconds, or the period may be specified in terms of an event, e.g., between the first time method XYZ starts running to the last time method XYZ is running, or between specified debugger breakpoints.

During a time intervals specifying step 812, a user or a default mechanism specifies the time intervals 224 to be used in the fingerprint(s). Time intervals may be specified by their length, e.g., one hundred microseconds, or by their number, e.g., divide the period of interest into sixty-four intervals. Some embodiments use a power of two as the number of intervals, e.g., to allow use of bit vectors to implement a record of interval activity.

During an interval activity indicating step 814, an embodiment indicates interval activity for an individual item and a cost (or specified set of costs). This may be accomplished using an occurrence mask, for example. The interval activity for an item and a cost indicates which time intervals the item incurred the cost(s) within and which of the time intervals that item did not incur any of the cost(s) within.

During an item selection parameter obtaining step 816, an embodiment obtains one or more parameters to guide automatic selection of items as candidates to be presented to developer(s). Parameters may include, for example, one or more of the following: N the number of items (or max number, or min number) to be automatically selected; M the threshold specifying the max (or min) percentage or absolute amount of cost(s) incurred by an item to qualify (or disqualify) the item for automatic selection; call chain context; symbols; other parameter(s). Parameters may be hardcoded, provided in a configuration file, or input by a user, for example. In the FIG. 7 example, N=20 and M=70% are hardcoded parameters. Other examples use different values, omit a parameter entirely as a criterion, and/or obtain the parameter values differently (e.g., by user input).

During an expensive item selecting step 818, an embodiment automatically selects N (see step 816) most expensive items as candidates for optimization. Some embodiments select least expensive items rather than, or in addition to, selecting the most expensive items.

Other criteria may be combined with the parameter N. For example, some embodiments select 818 the N most expensive diagnostically-named items each of whose cost is less than M percent of total cost and each of which has a different interval activity than the other selected 818 items. This example may be accomplished with processor time as the cost using steps illustrated in FIG. 10. The code 228 sorts 1002 all symbols by total inclusive time to generate an initial set of potential candidates. Selection skips 1004 any symbol whose inclusive time exceeds the threshold, skips 1006 any symbol that lacks a diagnostic name, and skips 1008 any symbol whose fingerprint interval activity is identical to the interval activity of a previously selected symbol. The set of selected symbols is pruned (or grown, depending on one's perspective) until the target number M of symbols is reached 1010, at which point the selection is done 1012.

During a sorting step 820, an embodiment sorts item fingerprints by total cost. Sorting 1002 is a special case of step 820 in which processor time is the cost. Familiar sorting mechanisms can be used.

During a comparing step 822, two or more fingerprints' respective interval activities are compared for equality, that is, to determine whether they show cost(s) incurred in the same set of intervals. When interval activity is implemented with bitmaps, step 822 can be accomplished by rapid bitwise operations. Comparing step 822 may be performed during skipping step 1008, for example.

During a selecting step 824, items are selected by when cost was incurred. For example, step 1008 is a special case of step 824 in which cost must have been incurred in a different time interval than the interval activity of any other selected item. Items may also be selected 824 by when cost was incurred by selecting, e.g., only items which incurred a cost after (before) a specified event or a specified absolute time.

During a particular selecting step 826, N most expensive items are selected for later display, each having a different fingerprint (in terms of interval activity) than the other selected items. Threshold parameter M is not necessarily involved in this step. Step 826 may implicate or rely on steps 808, 810, 812, 816, 818, 820, for example.

During a particular selecting step 828, N most expensive items, each having cost less than M percent of total cost, are selected for later display, each having a different fingerprint (in terms of interval activity) than the other selected items. Step 828 may implicate or rely on steps 808, 810, 812, 816, 818, 820, for example.

During a resource-based filtering step 830, an embodiment filters items based on whether specified resource(s) were (or were not) consumed. For instance, filtering 830 may use details about the cost incurred, such as the filename, drive identifier, address range, network port, and so on.

During a consumer-based filtering step 832, an embodiment filters items based on whether specified software consumed (or did not consume) resource(s). For instance, filtering 832 may use details about where the cost was incurred, such as the method frames, object names, and so on. Filtering step 830 and filtering step 832 can be combined in a given embodiment.

Filtering steps 830 and 832 support restricting the costs that are considered in the analysis. In some embodiments, a user may use consumer-based filtering 832 to specify that costs be considered only if certain frame(s) were implicated in the stack, or only if a certain frame(s) were not implicated, for example. Specifying method frames, plus partial name matching, allows a user to use filtering 832 to limit items to particular libraries or other defined sets of code in some embodiments. Some examples of (positive or negative) resource-based filtering 830 include filtering to only show disk costs on a specified drive, to only show memory costs from specified address ranges, to exclude network activity from specified (e.g., advertising) servers, or to include only network activity from specified servers. Filtering can allow a user to disregard known issues that otherwise make a cost-incurrence report harder to read, and/or allow automatically partitioning the costs into several categories for convenience.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

The foregoing steps and their interrelationships are discussed in greater detail below, in connection with various embodiments.

Some embodiments provide a process (or a medium configured to perform a process) utilizing a device which has a display 134, at least one logical processor 110, and a memory and/or other storage medium 112 in operable communication with the logical processor and the display. The process includes the processor obtaining 802 (i) profile data 202 for a plurality of cost-incurring items 204 capable of incurring a specified category 206 of cost, and (ii) a specification of a plurality of time intervals 224 within an execution time period of interest 208. The processor configures 804 the memory with a temporal cost incurrence fingerprint 212, namely, a structure which indicates for each cost-incurring item and for each time interval whether or not that item incurred a cost in the specified category within that time interval. The process also displays 806 the temporal cost incurrence fingerprint on the display.

In some embodiments, the cost-incurring items include software methods, and the specified category of cost is one of the following: processor usage measured in time, file I/O measured in time, file I/O measured in size, network I/O measured in time, network I/O measured in size, memory measured in size. In some, the temporal cost incurrence fingerprint includes a plurality of individual method fingerprints 216, each individual method fingerprint indicating interval activity for an individual method, namely, which of the time intervals that method incurred the cost within and which of the time intervals that method did not incur the cost within, and wherein the process selects 818 N most expensive methods each of whose cost is less than M percent of total cost and each of which has a different individual method fingerprint from the other selected most expensive methods, N and M being specified values.

In some embodiments, the cost-incurring items include method frames, namely, software methods in a specified call chain context, and the specified category of cost is one of the following: processor usage measured in time, energy/power consumption measured in SI or other units, file I/O measured in time, file I/O measured in size, network I/O measured in time, network I/O measured in size, memory measured in size. In some, the temporal cost incurrence fingerprint includes a plurality of individual method frame fingerprints 220, each individual method frame fingerprint indicating interval activity for an individual method frame, namely, which of the time intervals that method frame incurred the cost within and which of the time intervals that method frame did not incur the cost within, and the process selects 818 N most expensive method frames each of whose cost is less than M percent of total cost and each of which has a different individual method frame fingerprint from the other selected most expensive method frames, N and M being specified values.

In some embodiments, the execution time period of interest 208 is a specified proper subset of an execution run duration 210 of a piece of profiled software (a.k.a., program 120) which includes the cost-incurring items. Thus, the "time intervals" taken together form the "execution time period of interest", which in turn may be part or all of the "execution run duration". The "execution run duration" is the total duration of the profiled program's run.

In some embodiments, the temporal cost incurrence fingerprint includes a plurality of individual item fingerprints, each individual item fingerprint indicating interval activity for an individual item, namely, which of the time intervals that item incurred the cost within and which of the time intervals that item did not incur the cost within. In addition, the process includes at least one of the following: sorting 820 individual item fingerprints according to their respective costs, comparing 822 interval activity of one individual item fingerprint with interval activity of another individual item fingerprint. An individual item fingerprint includes the item's interval activity plus other information, e.g., the item's method name and/or call chain and/or other identifying info.

In some embodiments, the process further selects 818, 826 N items each of which has a different individual item fingerprint from the other selected items, N being a user-ratified value. N is "user-ratified" if (i) the user expressly specifies N, or (ii) the user accepts a default value of N by viewing and/or otherwise using the selection of N items. Some embodiments do not require throwing out the most expensive items, because there may be situations where the user wants all items listed, e.g., when the user is unsure where to set the cutoff M, investigating for instance whether it is usefully set at 70%, 80%, or 95%.

In some embodiments, the process selects 818, 828 N most expensive items each of whose cost is less than M, with M either a percent of total cost or an absolute cost, and with each selected item having a different individual item fingerprint from the other selected most expensive items, N and M being specified values.

Some embodiments provide a process (or a medium configured to perform a process) for assisting investigation of cost incurrence in software, the process including obtaining 802 profile data for a plurality of cost-incurring items capable of incurring a cost, and a specification of a plurality of time intervals within an execution time period of interest; configuring 804 a computer memory with a temporal cost incurrence fingerprint, namely, a structure which indicates for each cost-incurring item and for each time interval whether or not that item incurred the cost within that time interval; and selecting 824 items from among the plurality of cost-incurring items based on when the cost was incurred.

In some embodiments, the cost includes at least one of the following: processor usage, energy consumption, file I/O, network I/O, memory allocation. In some, a user can define cost in terms of two or more resources, e.g., as an expression involving several resources, In some embodiments, the cost includes execution of a specified individual method or execution of a specified library, for example. That is, the user specifies a function to look for, or a library such as a DLL binary or other executable, so that the user can observe when in time code belonging to that method or library was performed; for this purpose, any specified code (DLL, executable, package, plug-in, handler, etc.) can be considered a "library".

In some embodiments, the process selects N cost-extremity items each of which incurred the cost in a different time interval than at least one of the other selected cost-extremity items, N being a specified value. As used here, "cost-extremity" means most expensive when the user has manifested a focus on the most expensive items, and least expensive when focused on the least expensive items. Multiple bounds on cost may be specified in some embodiments, e.g., to select methods whose cost lies between M1 and M2 percent of total cost, such as between forty and seventy percent of total cost. In many situations, an embodiment is helpful in finding relatively expensive items which can then be investigated for ways to reduce cost. In addition, in some situations identifying relatively inexpensive methods can be helpful. For instance, suppose a program performs an infrequent, potentially very expensive operation Foo implemented by one developer, which another developer does not fully understand. It could be helpful to identify instances in which Foo is inexpensive, to find examples of efficient ways to do Foo that might help improve the other instances of Foo. More generally, some embodiments may be used to find optimal/near-optimal methods, as well as methods that could likely be improved by reducing their cost.

In some embodiments, the process selects N most expensive items each of whose cost is less than M percent of total cost of the most expensive item during the period of interest and each of which incurred the cost in a different time interval than at least one of the other selected most expensive items, N and M being specified values.

In some embodiments, the process selects software methods as items, a plurality of software methods incurred the cost at the same time, and the selecting step selects from them the software method which was invoked earliest during the execution time period of interest. Thus, if the methods all have the same fingerprint, the code picks the one that's highest in the stack.

In some embodiments, the number of time intervals within the execution time period of interest is user-specified. In some, the number of time intervals within the execution time period of interest is a power of two.

Configured Media

Some embodiments include a configured computer-readable storage medium 112. Medium 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory, which may be removable or not, and may be volatile or not, can be configured into an embodiment using items such as fingerprints 212, 216, and/or 220, interval activity 226 masks or bitmaps (a.k.a. bit vectors), and code 228 for automatically selecting candidates for optimization and/or bug fixes, in the form of data 118 and instructions 116, read from a removable medium 114 and/or another source such as a network connection, to form a configured medium. The configured medium 112 is capable of causing a computer system to perform process steps for creating fingerprints and/or automatically selecting optimization candidates as disclosed herein. FIGS. 1 through 7 thus help illustrate configured storage media embodiments and process embodiments, as well as system and process embodiments. Any of the process steps illustrated in FIGS. 8 through 10, or otherwise taught herein, may be used to help configure a storage medium to form a configured medium embodiment. Some embodiments may be provided in a Visual Studio® IDE.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 8 through 10 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process utilizing a device which has a display, at least one logical processor, and a memory in communication with the logical processor and the display, the process comprising the steps of:

the processor obtaining (i) profile data for a plurality of cost-incurring items capable of incurring at least one specified category of cost, each of which specified category is one of the following categories: processor usage measured in time or cycles, processor non-usage, energy consumption, power consumption, file I/O measured in time, file I/O measured in size, network I/O measured in time, network I/O measured in size, memory measured in size, execution of a specified method, execution of a specified library, and (ii) a specification of a plurality of time intervals within an execution time period of interest;

the processor configuring the memory with a temporal cost incurrence fingerprint, namely, a structure which indicates for each cost-incurring item and for each time interval whether or not that item incurred a cost in the specified category within that time interval;

displaying the temporal cost incurrence fingerprint on the display; and wherein the process is further characterized in at least one of the following ways:

(a) the cost-incurring items include software methods, the temporal cost incurrence fingerprint includes a plurality of individual method fingerprints with each individual method fingerprint indicating interval activity for an individual method by indicating which of the time intervals that method incurred the cost within and which of the time intervals that method did not incur the cost within, and the process further comprises the step of selecting N most expensive methods each of whose cost is less than M percent of total cost and each of which has a different individual method fingerprint from the other selected most expensive methods, N and M being specific values; (b) the cost-incurring items include method frames which are software methods in a specified call chain context, the temporal cost incurrence fingerprint includes a plurality of individual method frame fingerprints with each individual method frame fingerprint indicating interval activity for an individual method frame by indicating which of the time intervals that method frame incurred the cost within and which of the time intervals that method frame did not incur the cost within, and and the process further comprises the step of selecting N most expensive method frames each of whose cost is less than M percent of total cost and each of which has a different individual method frame fingerprint from the other selected most expensive method frames, N and M being specific values.

2. The process of claim 1, wherein the cost-incurring items include software methods.

3. The process of claim 1, wherein the cost-incurring items include method frames, namely, software methods in a specified call chain context.

4. The process of claim 1, wherein the execution time period of interest is a specified proper subset of an execution run duration of a piece of profiled software which includes the cost-incurring items.

5. The process of claim 1:
wherein the temporal cost incurrence fingerprint includes a plurality of individual item fingerprints, each individual item fingerprint indicating interval activity for an individual item, namely, which of the time intervals that item incurred the cost within and which of the time intervals that item did not incur the cost within; and
wherein the process further comprises at least one of the following:
sorting individual item fingerprints according to their respective costs;
comparing interval activity of one individual item fingerprint with interval activity of another individual item fingerprint.

6. The process of claim 5, wherein the process further comprises selecting N items each of which has a different individual item fingerprint from the other selected items, N being a user-ratified value.

7. The process of claim 6, wherein the process comprises selecting N most expensive items each of whose cost is less than M, with M either a percent of total cost or an absolute cost, and with each selected item having a different individual item fingerprint from the other selected most expensive items, N and M being specified values.

8. The process of claim 1, wherein at least one of the following conditions is met:
the number of time intervals within the execution time period of interest is user-specified;
the number of time intervals within the execution time period of interest is a power of two.

9. A computer-readable storage medium configured with data and with instructions that when executed by at least one processor causes the at least one processor to perform a process for assisting investigation of cost incurrence in software, the process comprising the steps of:
obtaining (i) profile data for a plurality of cost-incurring items capable of incurring a cost, and (ii) a specification of a plurality of time intervals within an execution time period of interest;
configuring a computer memory with a temporal cost incurrence fingerprint, namely, a structure which indicates for each cost-incurring item and for each time interval whether or not that item incurred the cost within that time interval, the temporal cost incurrence fingerprint including a plurality of individual cost-incurring item fingerprints with each individual cost-incurring item fingerprint indicating interval activity for an individual cost-incurring item;
selecting N most expensive cost-incurring items each of whose cost is less than M percent of total cost and each of which has a different individual cost-incurring item fingerprint from the other selected most expensive cost-incurring items, N and M being specific values, the selected cost-incurring items including software methods and/or method frames; and
filtering cost-incurring items based on at least one of the following: which cost was incurred, which cost was not incurred, where the cost was incurred, where the cost was not incurred.

10. The configured medium of claim 9, wherein the cost includes at least one of the following: processor usage, processor blockage, file I/O, network I/O, memory allocation, execution of a specified method, execution of a specified library.

11. The configured medium of claim 9, wherein the process comprises selecting N cost-extremity items each of which incurred the cost in a different time interval than at least one of the other selected cost-extremity items, N being a specified value.

12. The configured medium of claim 9, wherein: the process comprises selecting software methods as items, a plurality of software methods incurred the cost at the same time, and the selecting step selects from them the software method which was invoked earliest during the execution time period of interest.

13. The configured medium of claim 9, wherein at least one of the following conditions is met:
the number of time intervals within the execution time period of interest is user-specified;
the number of time intervals within the execution time period of interest is a power of two.

14. The configured medium of claim 9, wherein the process further comprises displaying a visual representation of at least three of the individual item fingerprints, and wherein each item fingerprint includes a diagnostic name.

15. A computer system comprising:
a logical processor;
a memory in communication with the logical processor;
a temporal cost incurrence fingerprint residing in the memory and including a plurality of individual item fingerprints for respective cost-incurring items, each individual item fingerprint having a plurality of time intervals and indicating for the cost-incurring item and for each time interval whether or not that item incurred the cost within that time interval;
software residing in the memory which upon execution by the logical processor will obtain (i) profile data for the plurality of cost-incurring items capable of incurring a cost, and (ii) a specification of the plurality of time intervals within an execution time period of interest; and
a selection residing in the memory and identifying N most expensive cost-incurring items each of whose cost is less than M percent of total cost and each of which has a different individual cost-incurring item fingerprint from the other selected most expensive cost-incurring items, N and M being specific values, the selected cost-incurring items including software methods and/or method frames, the selected cost-incurring items being in at least one of the following categories: processor usage measured in time or cycles, processor non-usage, energy consumption, power consumption, file I/O measured in time, file I/O measured in size, network I/O measured in time, network I/O measured in size, memory measured in size, execution of a specified method, execution of a specified library.

16. The system of claim 15, further comprising a display configured by a visual representation of at least three of the individual item fingerprints, and wherein each item fingerprint includes a diagnostic name.

17. The system of claim 15, further comprising a display configured by a visual representation of at least seven of the individual item fingerprints, and wherein each item fingerprint includes a diagnostic name.

18. The system of claim 15, further comprising an item selection tool capable of automatically selecting N most expensive items each of whose cost is less than M percent of total cost and each of which has a different individual item fingerprint from the other selected most expensive items, N and M being specified values with N at least twelve.

19. The system of claim 15, wherein: each individual item fingerprint has an associated call chain, the cost-incurring items include software methods, and a particular software method has at least two individual item fingerprints corresponding to different call chains in which the method is called.

20. The system of claim 15, further comprising a selection residing in the memory and identifying N cost-extremity items each of which incurred the cost in a different time interval than at least one of the other selected cost-extremity items, N being a specified value.

* * * * *